(12) United States Patent
Sumida et al.

(10) Patent No.: US 7,724,800 B2
(45) Date of Patent: May 25, 2010

(54) POWER SCALEABLE THIN DISK LASERS

(75) Inventors: David S. Sumida, Los Angeles, CA (US); Hans W. Bruesselbach, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/760,470

(22) Filed: Jun. 8, 2007

(65) Prior Publication Data

US 2008/0304534 A1 Dec. 11, 2008

(51) Int. Cl.
*H01S 3/06* (2006.01)
(52) U.S. Cl. .......................................... 372/67; 372/6
(58) Field of Classification Search ............... 372/36, 372/69, 72, 67; 385/88
See application file for complete search history.

(56) References Cited

U.S. PATENT DOCUMENTS

| | | | | |
|---|---|---|---|---|
| 3,440,561 A | * | 4/1969 | Pole et al. | 372/24 |
| 3,516,013 A | * | 6/1970 | Pole | 372/24 |
| 2005/0058162 A1 | * | 3/2005 | Nomura et al. | 372/9 |
| 2006/0078031 A1 | * | 4/2006 | Govorkov et al. | 372/69 |
| 2006/0227842 A1 | * | 10/2006 | Townsend et al. | 372/69 |

FOREIGN PATENT DOCUMENTS

DE   10 2004 010 224 A   11/2005

OTHER PUBLICATIONS

Dr. Adolf Giesen et al.; "Thin-Disk Lasers Come of Age"; Photonics Spectra, pp. 52-58; May 2007.*
Dr. Adolf Giesen et al.; "Thin-Disk Lasers Come of Age"; Photonics Spectra, pp. 52-58; May 2007.
Yamamoto et al., High power continuous-wave operation of side-pumped Yb:YAG thin disk laser, Mitsubishi Electric Corporation, 2003, 2 pages.

* cited by examiner

*Primary Examiner*—Minsun Harvey
*Assistant Examiner*—Tuan N. Nguyen
(74) *Attorney, Agent, or Firm*—Haynes & Boone, LLP.

(57) ABSTRACT

A thin disk laser includes a thin disk of a host material incorporating a laser gain medium. The disk has opposite first and second surfaces, at least one of which is non-planar. The first surface is coated with a high reflectivity coating. The second surface has an anti-reflection coating thereon. The shape and mounting of the laser is such that mismatch of the coefficients of thermal expansion between the disk laser and the mount does not affect scaling of the laser to larger size disks for higher power lasers.

28 Claims, 4 Drawing Sheets

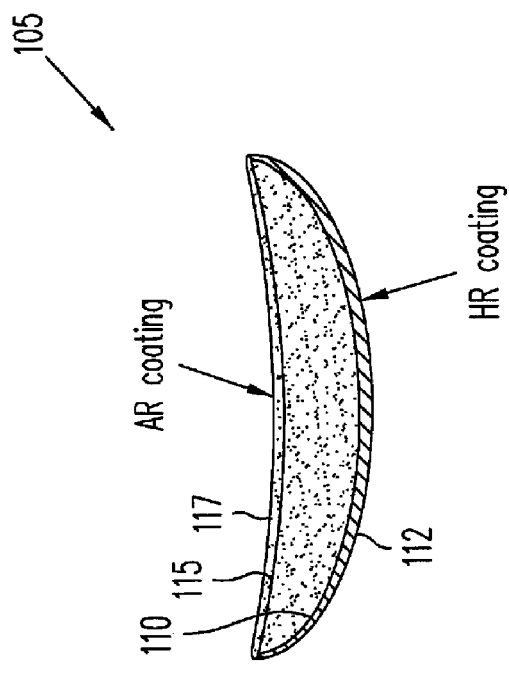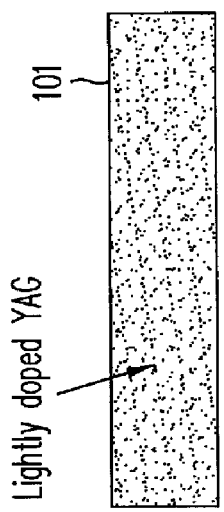
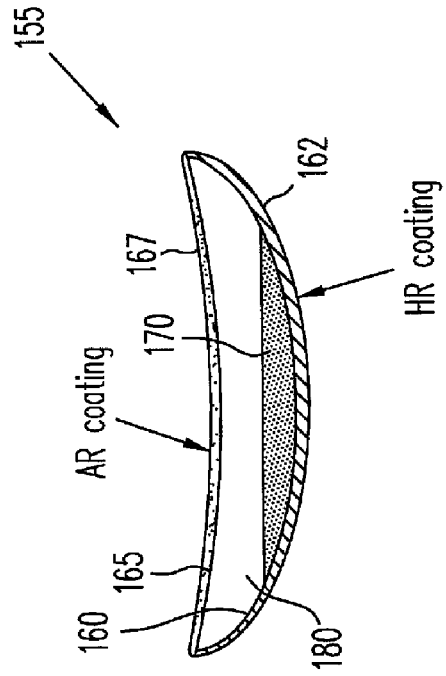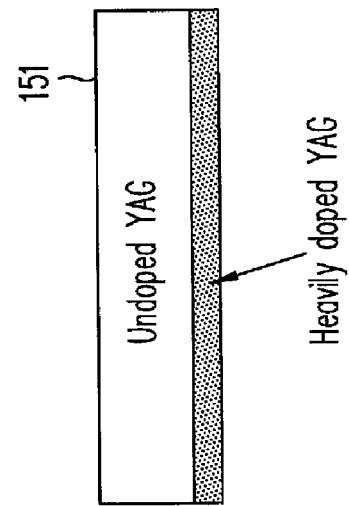
FIG. 1A
FIG. 1B

POWER SCALEABLE THIN DISK LASERS

TECHNICAL FIELD

The present disclosure relates generally to disk lasers and, more particularly, to high power doped thin-disk lasers and methods for making them.

BACKGROUND

A thin disk laser, sometimes referred to as an "active mirror," is an optical amplifier gain medium, typically but not necessarily disk-shaped, in which stimulated emission of light, i.e., "lasing," is produced when a pump laser illuminates the disk, resulting in gain in emitted light. Conventional thin-disk lasers may be made from ytterbium (Yb) doped yttrium aluminum garnet (YAG) disks bonded to heat sinks or heat spreaders, such as diamond or copper. In conventional thin disk laser systems, the crystal of the gain medium, which may have an anti-reflection (AR) coating on the front side thereof that is effective at both the incident pump and emitted laser radiation wavelengths, is fixed to the heat sink/spreader with a layer of indium or equivalent bonding solder or adhesive. The heat sink may be liquid cooled (e.g., with water), or by use of a thermoelectric (TE) cooler, from the back side.

The significant difference in the respective coefficients of thermal expansion (CTE) values of the heat sink and the disk laser prevents device scaling to larger diameters for operation at increased power output. In particular, if the bonding operation occurs at room temperature or above, larger devices are limited to operation at close to the assembly temperature to prevent catastrophic failure.

More particularly, conventional thin disk lasers typically operate at room temperature, which is usually the same temperature at which the thin disk laser system (comprising, for example, a diamond heat sink, adhesive and Yb:YAG gain medium:host material) is assembled, and at reduced power levels, so that CTE issues are neither confronted nor resolved. Conventional designs may also incorporate an outer region of the disk that is not pumped to aid in disk integrity, and support heat dissipation requirements. However, as the disk is operated at increasing power output levels, sufficient temperature differences can occur across the disk area, as well as the interfacial bonding region between the disk and the heat spreader, to cause catastrophic failure due to the differences in the respective material CTE's.

Additionally, it is known that the efficiency and performance of such devices improve as their operating temperature is lowered, for example, to cryogenic temperatures. However, the difference between CTE's of the disk and heat spreader may again lead to failure upon cooling below the assembly temperature. The foregoing CTE issues thus severely limit scaling of the device size to produce higher output powers. In addition, the resulting thermally induced stresses may introduce undesirable aberration in the output beam by distorting the laser crystal optically, and otherwise degrade the quality or brightness of the laser light produced.

In light of the foregoing, there is a need for thin disk laser design and assembly methods that eliminate or reduce the CTE mismatch problem to enable device scaling for higher output.

BRIEF SUMMARY

In accordance with the exemplary embodiments described herein, thin-disk lasers and methods for manufacturing them are disclosed that overcome the above and other problems of prior art thin-disk lasers, thereby enabling device scaling for higher power and brightness laser light output.

In one exemplary embodiment, a laser includes a thin disk comprising a host material doped with a laser gain medium, having opposite first and second surfaces, wherein at least one of the two surfaces is non-planar. The first surface may have a planar, a concave or a convex shape and is coated with a high reflectivity (HR) coating. The second surface has an anti-reflection (AR) coating thereon, and may have a concave, planar, or convex shape.

In another exemplary embodiment, a laser assembly includes a thin disk laser, the disk comprised of host material and laser gain medium, having opposite first and second surfaces, wherein at least one of the two surfaces has a non-planar shape. The first surface may have a concave, a planar, or a convex shape and a high reflectivity (HR) coating thereon, and the second surface may have a planar, a concave or a convex shape with an antireflection (AR) coating thereon. A housing supports the thin disk laser and has a hollow interior for sealingly retaining and circulating coolant fluid in direct contact with the first surface. The assembly further includes an apparatus to illuminate the second surface with a pump beam of a selected wavelength of laser light to excite the thin disk laser. The assembly further includes a second mirror which, in combination with the thin disk laser, forms a resonant laser cavity, and which is operable to transmit a portion of the laser light as an output beam.

A more complete understanding of the novel thin disk laser embodiments disclosed herein will be afforded to those skilled in the art, as well as a realization of additional advantages thereof, by a consideration of the following detailed description of one or more exemplary embodiments, particularly if considered in conjunction with the appended drawings, wherein like reference numerals are used to identify like elements illustrated in one or more of the figures thereof.

BRIEF DESCRIPTION OF THE DRAWINGS

FIG. 1A is a cross-section elevation view of an exemplary embodiment of a thin disk laser formed from lightly doped yttrium aluminum garnet (YAG) in accordance with the present disclosure.

FIG. 1B is a cross-sectional elevation view of another exemplary embodiment of a thin laser disk formed from a YAG crystal with a heavily doped region and an un-doped region in accordance with the disclosure.

DETAILED DESCRIPTION

Figure 2A:
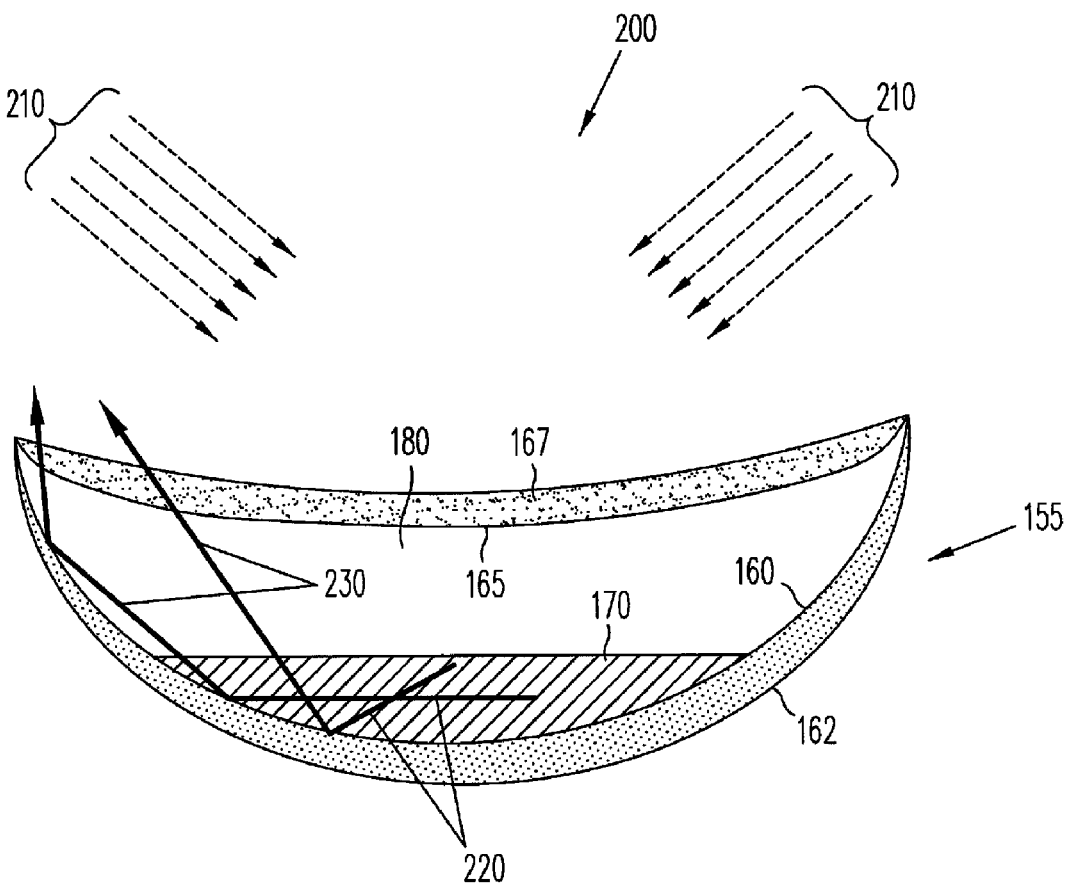
FIG. 2A is an enlarged cross-sectional view of the exemplary thin disk laser of FIG. 1B, showing the effect of its shape on transverse amplified spontaneous emission to suppress parasitic oscillations.

FIG. 1A illustrates the shape of an exemplary embodiment of a thin disk laser 100A in accordance with the present disclosure, which may be formed from a host material such as YAG crystal 101 that is lightly doped with an ionic atom such as Ytterbium (Yb). YAG crystal 101 may be oriented with the <110> axis parallel to the lasing axis to minimize thermally induced birefringence. Crystal 101 may be on the order of one mm thick and may be ground and polished to form thin-disk laser 105 having a first surface 110 with a convex curvature, but other curvatures are admissible, including a planar surface. The meaning of convex and concave curvature is not limited to spherical curvature. First surface 110 may have a high reflectivity (HR) coating 112 deposited by one of several well known deposition processes, including thermal evaporation, sputtering, chemical vapor deposition, or equivalent techniques well known in the art. HR coating 112 may be a metal, or alternatively, it may be a quarter-wave multilayer coating scaled to have high reflectivity over a selected range of wavelengths that may include the pump and lasing radiation. HR coating 112 may be applied to maximize radiation of amplified stimulated emission in a direction toward a second surface 115 of laser 105.

Other host materials may be used besides YAG. Such materials preferably have one or more of the following properties: higher thermal conductivity than yttrium aluminum garnet (YAG), higher absorption cross section than ytterbium (Yb) doped YAG, broader absorption than YAG, and reduced quenching effects compared to Yb:YAG. Examples of such materials include, but are not limited to: $Lu_2O_3$, $YVO_4$, $LuVO_4$, $Sc_2O_3$, $LaSc_3(BO_3)_4$, $KGd(WO_4)_2$, and $KY(WO_4)_2$.

Other laser gain media (dopants) may be used besides Yb with the host materials indicated above. Such laser gain medium dopants known to enable solid state lasing include, but are not limited to: neodymium (Nd), thulium (Tm), holmium (Ho), and chromium (Cr). Other combinations of dopants and host materials may be determined and may be incorporated in the structures disclosed herein.

The second surface 115 of laser 105 may be flat, concave or convex, provided only one of the two surfaces is planar. Additionally, second surface 115 may be coated with an anti-reflection (AR) layer 117 to minimize reflection of light away from the second surface 115 of laser 105. AR layer 117 may be designed to provide minimized reflection at both the pump and lasing radiation wavelengths.

FIG. 1B illustrates another exemplary embodiment of a thin disk laser in accordance with the present disclosure, which is formed from a YAG crystal 151 with a heavily doped region 170 and an un-doped region 180. In this exemplary embodiment, un-doped region 180 may be on the order of one mm thick, and heavily doped region 170 may be on the order of one hundred microns thick, or larger. YAG crystal 151 comprising the two regions may be formed by a variety of processes, including, for example, diffusion bonding of two separate crystals, one doped (i.e., 170) and the other un-doped (i.e., 180). Crystal 151 may be ground and polished to form thin disk laser 155 having a first surface 160 with a convex curvature on the heavily doped side. First surface 160 may preferably have a high reflectivity (HR) coating 162 deposited by one of several well known deposition processes, as described above. HR coating 162 may be a metal, or alternatively, it may be a quarter-wave multilayer coating scaled to have high reflectivity at the pump and lasing wavelengths. HR coating may be applied to maximize radiation of amplified stimulated emission in a direction toward a second surface 165 of laser 155.

The second surface 165 of laser 155 may be flat, concave or convex. Additionally, surface 165 may be coated with an anti-reflection layer 167 that minimizes reflection of light away from second surface 165 of laser 155.

The shape of laser 105 and laser 155 may be chosen to overcome a plurality of issues that limit scaling to larger sizes and larger optical power outputs. The convex first surface 110 and 160 of crystals 105 and 155, respectively, add strength to the disk structure when subject to the pressure of a coolant that may be applied directly to the first surface, as opposed to an intervening heat sink, e.g., a diamond heat sink, of conventional thin disk lasers.

Additionally, FIG. 2A shows the effect of shape on transverse amplified spontaneous emission (ASE) to suppress parasitic oscillations, in accordance with the exemplary embodiment of FIG. 1B. ASE is produced when a laser gain medium is pumped to produce a population inversion. Feedback of the ASE by the laser's optical cavity produces laser operation if the lasing threshold is reached.

Excess ASE, i.e., emission generated in directions other than along the laser cavity axis, e.g., rays 220 and 230, is an unwanted effect in lasers, since it dissipates some of the laser's power by excitation of unwanted lasing, for example, in a lateral or other direction, where it is wasted. Furthermore, unwanted ASE lasing may cause oscillations or instability in the desired lasing direction. For example, in conventional thin disk lasers with flat surfaces and vertical side walls, parasitic oscillation may arise in the direction transverse to the intended output direction created by the radial cavity. As shown in FIG. 2A, laser disk 155 may be meniscus shaped so as to have only two surfaces, so that no resonant cavity is formed with a shape that might otherwise permit parasitic transverse oscillations to occur. When illuminated by pump radiation 210, ASE may result in rays of stimulated light emission in a generally transverse direction being excited in heavily doped region 170.

Thus, as illustrated in FIG. 2A, because laser 165 is shaped with a convex curvature on first surface 160 and this surface has HR coating 162 thereon, the transverse ASE rays are deflected by internal reflection out of the volume of laser 155 so as to exit the disk from second surface 115 or 165, thus suppressing undesirable transverse lasing oscillations. In optical amplifiers, ASE limits the achievable gain and increases laser noise level. ASE (together with overheating and background scattering loss) may limit the maximum size (and power) of conventional thin disk lasers, especially if the main laser radiation field travels through a lasing medium with a short but wide gain region, which is the case with disk lasers. It may therefore be appreciated that the combination of shaping and HR coating may significantly reduce heating and losses due to transverse ASE, thus reducing a limitation to scaling for higher power.

Additionally, the detailed figure (i.e., the detailed profile thickness) as ground and polished on second side 115 and 165 of crystals 105 and 155 can be determined by known modeling techniques to substantially cancel wave-front distortions (also referred to as Optical Path Distortion—OPD) due to transverse thermal gradients affecting the index of refraction and thickness dimension of laser 105 or 155. This may involve figure correction polishing on the order of a fraction of a wavelength change in thickness (from a nominal value that ignores OPD effects) over a radial dimension on the order of one mm (i.e., a figure correction based on thermal gradient effects that is on the order of a fraction of a wavelength over a radial distance on the order of 1000 wavelengths).

Figure 2B:
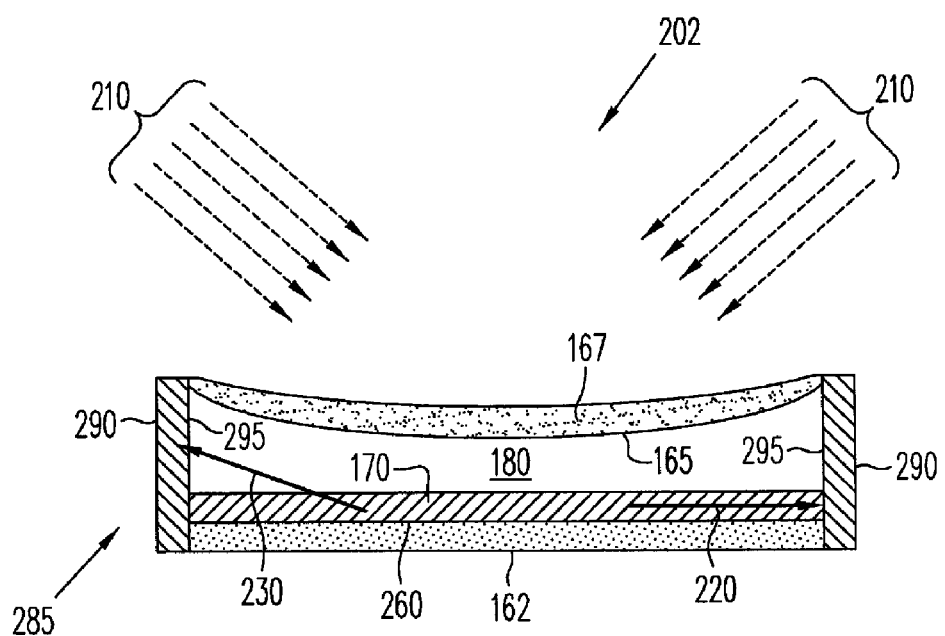
FIG. 2B is an enlarged cross-sectional view of an exemplary thin disk laser having a planar first surface, in accordance with the present disclosure.

FIG. 2B is an enlarged cross-sectional view of another exemplary embodiment of a thin disk laser 202 having a disk 285 with a planar first surface 260 in accordance with the present disclosure. For exemplary purposes, second surface 165 is shown as concave, but it should be understood that second surface 165 may also be convex. Additionally, laser 285 comprises a heavily doped portion 160 and an undoped portion 180, but the following discussion applies equally to a host material that is lightly doped throughout. The host material, for example, may be YAG, and the dopant, for example, may be Yb, but other hosts and dopants may be used, as indicated above. In the exemplary embodiment of FIG. 2B, ASE may be excited in the horizontal direction. In this embodiment, where one surface is planar, the laser 285 may include a vertical sidewall 295. In this case, ASE light rays 220 and 230 may be excited in a substantially trans-verse direction. The presence of vertical sidewall 295 may result in undesirable cavity resonance behavior, as discussed above. In this case, a border 290 may be applied to the surface of vertical wall 295 to suppress transverse ASE. Border 290 may be implemented in various ways, including but not limited to creating a roughened texture on vertical wall 295 to scatter light, or alternatively, border 290 may be a cladding applied to vertical wall 295 that is optically absorptive at the lasing radiation wavelength. Additionally, border 290 may be implemented by faceting vertical wall 295 to incorporate a polygonal shape, which may have irregular sides to suppress transverse ASE resonance, and may optionally be combined with absorbing materials or scattering texture.

Additionally, figure correction may also be provided by corrective grinding and polishing of first surface 115 or 165, or a combination of figure correction on both first and second surfaces. Thus, fractional wavelength correction of the optical path can be effected as a function of the radial position to take into account thermal distortions that may occur in radial symmetry during lasing operation.

Figure 3:
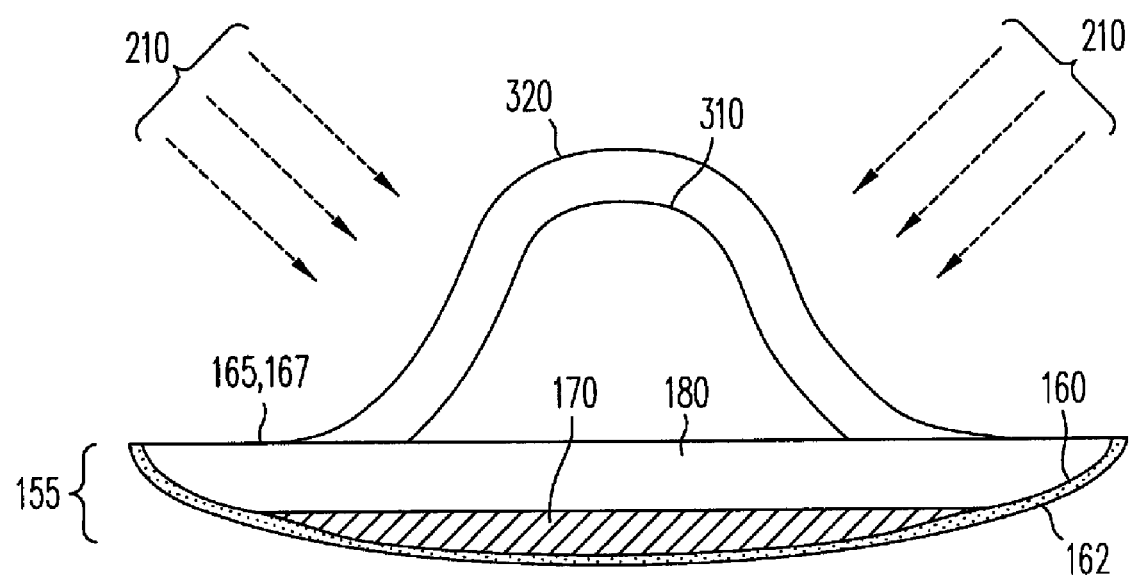
FIG. 3 is an enlarged cross-sectional view of an exemplary thin disk laser, illustrating an exemplary embodiment of a relative mode distribution of pump and laser radiation in accordance with the disclosure.

As illustrated in FIG. 3, detailed figure correction polishing may also be made more beneficial by shaping the incident pump radiation 210 to have a pump beam profile 310 so that the intensity gradient is gradual. For convenience, the following discussion is with respect to thin disk laser embodiment 155 of FIG. 1B, but applies equally to thin disk laser embodiment 105 of FIG. 1A. An exemplary shape of pump beam profile 310 may be, for example, approximately Gaussian, or a similar intensity profile, such that the intensity transition from maximum to zero in a radial direction is not abrupt, as in a conventional "top-hat" intensity profile of the type discussed below.

Thus, in the absence of strong gradients in pump beam profile 310 energy intensity, there may also be a smooth gradient in the laser mode profile 320 that is produced, further reducing strong thermal gradients in the radial direction that typically lead to thermal stress failure of disk 105 or 155. Thus, pump beam profile 310 and laser mode profile 320 may both be taken into account during predictive modeling in determining the figure correction required.

Shaping the pump beam profile 310 energy relative to the laser mode profile may also enhance the efficiency of lasing. By matching the profile overlap of the pump beam profile 310 of energy intensity to the laser mode profile 320 that is being excited, the input pump energy may be applied to substantially excite emission only in the area of the disk that supports laser mode 320.

In a typical resonator laser cavity, both the mirror formed by HR coating 112 or 162 formed on crystal 105 or 155 and an external mirror, such as, for example, a "scraper mirror" or a gradient reflectivity mirror (GRM), that completes the resonator cavity determine the stability and beam mode shape. For a stable laser mode, one or both mirrors forming a laser cavity must have a degree of concave surface of reflection. The focal lengths of the one or more mirrors will determine, to a large extent, the shape and diameter of the cavity mode, and is determined by the characteristics of the mirror(s). Thus, laser beam profile 320 and diameter are determined by a number of geometric parameters and material characteristics, and not only by the shape and extent of lasing material (i.e., dopant and host material, such as Yb:YAG).

Conventional disk lasers, which are typically uniformly illuminated with a "top-hat" profile pump beam may have significant thermally induced aberrations at the edge of the pumped area, rendering only a limited central portion of the doped crystal area usable for high beam quality lasing. Thus, profile shaping and control of the pump beam and the laser beam may render the laser beam aberration-free over a larger portion of laser disk 105 or 106.

Figure 4:
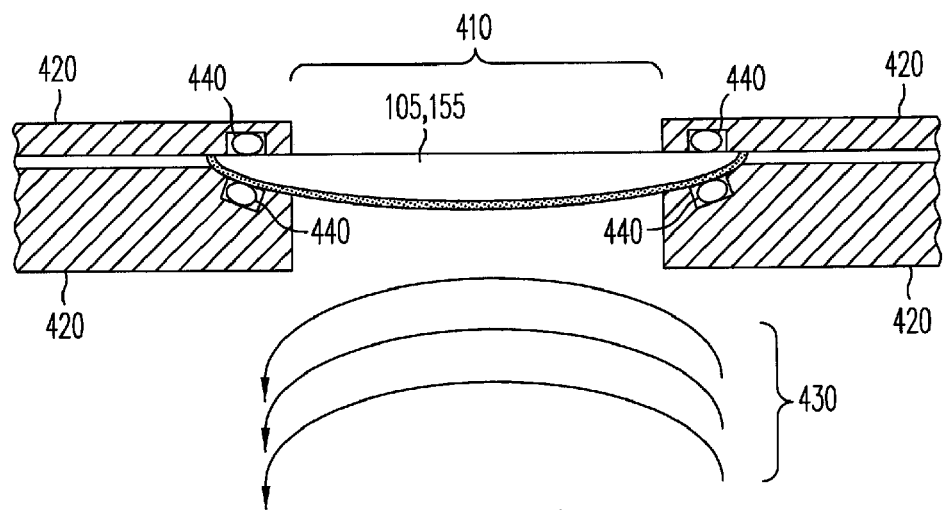
FIG. 4 is a cross-sectional elevation view of an exemplary thin disk laser mounted in a housing of an exemplary embodiment of thin-disk laser system in accordance with the disclosure.

FIG. 4 illustrates an exemplary thin disk laser mounted in a housing 420 of an exemplary embodiment of a thin-disk laser system. In accordance with the particular exemplary embodiment illustrated, thin disk laser 105 or 155 may be seated over an opening 410 extending into a hollow housing 420 containing circulating coolant 430. Laser 105 or 155 may be sealingly supported in housing 420 via one or more O-rings 440 or an equivalent compressible sealant, which may provide both stress relief for laser 105 or 155, and seal housing against leakage of coolant 430. Where the coolant is selected to maintain a cryogenic temperature to further boost the efficiency of disk laser 105 or 155, O-rings 440 or an equivalent compressible sealant may be chosen to preferably have flexibility at the operating temperature of coolant 430, which in one exemplary embodiment, may be maintained at a temperature of about 100 degrees K., or lower.

Figure 5:
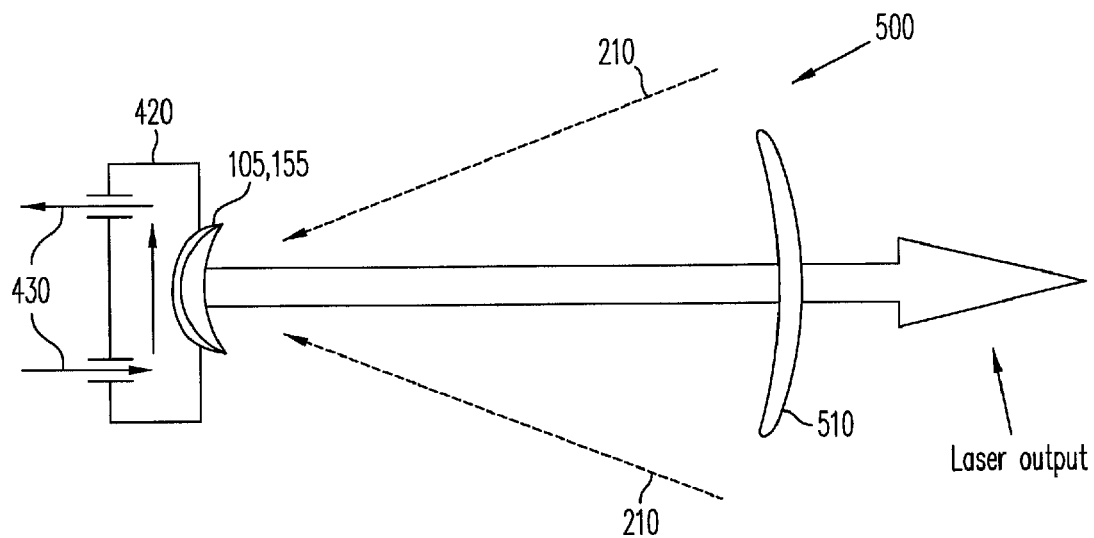
FIG. 5 is schematic cross-sectional side view of another exemplary embodiment of a thin disk laser assembly in accordance with the disclosure.

Referring to FIG. 5, another exemplary embodiment of a thin disk laser assembly 500 includes thin disk laser 105 or 155 mounted in housing 420 which provides coolant 430, which may be recirculated by connection to an external chiller (not shown) for heat rejection. Pump radiation 210 is configured to form an intensity profile as described above in connection with FIG. 3. The first surface 110 or 160 of laser 105 or 155, respectively, with respective HR coatings 112 or 162, form one mirror of the resonator cavity of assembly 500. Mirror 510 forms the second mirror, completing the cavity. Other embodiments may be contemplated, including complex pump beam configurations, use of specialized scraper mirror, gradient reflectivity mirrors, and folded path cavities, which are in the scope of the disclosure.

Embodiments described above illustrate but do not limit the invention. It should also be understood that numerous modifications and variations are possible in accordance with the principles of the present invention. Accordingly, the scope of the invention is defined only by the following claims and their functional equivalents.

What is claimed is:

1. A laser, comprising:
   an optical gain medium consisting of a thin disk of a crystalline host material doped with a laser gain material and having opposite first and second surfaces, wherein:
   at least one of the two surfaces of the thin disk is non-planar;
   the first surface has a planar, a concave or a convex shape and is coated with a high reflectivity (HR) coating;
   the second surface is coated with an anti-reflection (AR) coating;

the laser gain material is selected from the group consisting of ytterbium (Yb), neodymium (Nd), thulium (Tm), holmium (Ho), and chromium (Cr);
the first surface of the disk is spaced apart from the second surface is connected to the second surface of the disk by a vertical side wall;
a border is disposed on the outer surface of the vertical side wall; and,
the border comprises a light scattering surface of the vertical side wall.

2. The laser of claim 1, wherein the second surface has a planar, a concave or a convex shape.

3. The laser of claim 1, wherein each of the HR coating and the AR coating are adapted to function at both a pump radiation wavelength and the disk laser radiation wavelength.

4. The laser of claim 1, further comprising apparatus operable to illuminate the second surface with a pump beam of light radiation.

5. The laser of claim 1, wherein the host material of the disk is lightly doped with the laser gain material.

6. The laser of claim 1, wherein the disk consists of a portion disposed adjacent to the first surface that is heavily doped with the laser gain material, and a portion disposed adjacent to the second surface that consists of the un-doped host material.

7. The laser of claim 6, wherein the disk consists of a disk of un-doped host material diffusion bonded to a disk of heavily doped host material.

8. The laser of claim 6, wherein the first surface of the disk is convex and the heavily doped host material portion extends laterally to a portion of the first surface that is less than the entire first surface.

9. The laser of claim 8, wherein the convex shape of the disk first surface and the HR coating are operable to deflect amplified spontaneous emission and to suppress transverse parasitic oscillations in the thin disk of the laser.

10. The laser of claim 1, wherein the disk is circular or elliptical.

11. The laser of claim 1, wherein the host material is yttrium aluminum garnet (YAG) and the crystallographic orientation of the YAG disk is <110> in a direction parallel to the lasing axis of the laser.

12. A method for compensating the laser of claim 1 for optical path distortion caused by radial thermal gradients in the disk, the method comprising figuring at least one of the first and second surfaces of the disk radially by polishing away from a selected nominal curvature a volume of the host material of about one micron deep or less over one or more radial increments of about one millimeter, as measured from the center of the disk.

13. The laser of claim 1, wherein the host material has at least one of a higher thermal conductivity, a higher absorption cross section, a broader absorption, or a reduced quenching effect, than doped yttrium aluminum garnet (YAG).

14. The laser of claim 13, wherein the host material is selected from the group consisting of $Lu_2O_3$, $YVO_4$, $LuVO_4$, $Sc_2O_3$, $LaSc_3(BO_3)_4$, $KGd(WO_4)_2$, and $KY(WO_4)_2$.

15. The laser of claim 1, wherein the border comprises a material clad to the vertical side wall that is absorbing at the wave-length of the laser light emitted by the laser.

16. A method of lasing, the method comprising:
providing a laser in accordance with claim 1; and,
irradiating the second surface of the disk with a beam of light from a pump source.

17. The method of claim 16, further comprising:
positioning an output mirror facing and spaced apart from the second surface of the disk and having a partial transparency at the lasing wave-length of the laser so as to form a laser resonator cavity in combination with the HR coating on the second surface of the disk.

18. The method of claim 16, further comprising:
mounting the laser in a housing adapted to circulate coolant in direct contact with the second surface of the disk; and,
circulating a cooling fluid over the second surface of the disk during operation thereof.

19. The method of claim 16, further comprising figuring the disk by polishing away from a selected nominal curvature a volume of host material from either or both sides of the disk about one micron deep or less over one or more radial increments of about one millimeter, as measured from the center of the disk.

20. The method of claim 16, further comprising shaping the beam of the pump source to have an intensity profile that is continuous and that monotonically decreases in a radial direction from a maximum at the center of the disk to a substantially negligible intensity at a selected radial distance from the disk center.

21. The method of claim 16, wherein the disk includes a vertical peripheral sidewall, and further comprising:
forming a light scattering or absorbing border on the vertical sidewall.

22. A laser assembly, comprising:
a gain medium consisting of a thin disk of a crystalline host material doped with a laser gain material and having opposite first and second surfaces, wherein at least one of the surfaces of the disk is non-planar, the first surface having a planar, concave or convex shape and a high reflectivity (HR) coating thereon, the HR coating comprising a first mirror of a resonant cavity, the second surface having a flat, a concave or a convex shape with an antireflection (AR) coating thereon;
a laser housing having a hollow interior for circulating a coolant fluid over the first surface of the disk and for receiving and supporting the disk at a peripheral edge thereof such that the first surface of the disk faces toward the hollow interior of the housing, the housing further including a seal formed at the peripheral edge of the disk so as to sealingly retain both the disk and the coolant fluid therein;
apparatus for illuminating the second surface of the disk with a pump beam of light in such a way as to cause the gain medium to lase; and,
a second mirror disposed external to the disk and facing the AR coated second surface of the disk, the second mirror comprising a second mirror of the resonant cavity, wherein:
the second mirror is operable to reflect a first portion of the laser light emitted by the disk back through the second surface of the disk and to couple out a second portion of the laser light in the form of an output beam, and
the pump beam has an intensity profile that is continuous and that monotonically decreases in a radial direction from a maximum at the center of the disk to a substantially negligible intensity at a selected radial distance from the disk center.

23. The laser assembly of claim 22, wherein the coolant is recirculated between the housing and an external chiller for conveying heat away from the disk.

24. The laser assembly of claim 23, wherein the coolant fluid is maintained at a temperature of about 100 degrees K. or lower.

25. The laser assembly of claim 22, wherein the selected radial distance is less than the radius of the disk.

26. The laser assembly of claim 25, wherein the laser has a mode intensity profile at the second surface of the disk that is determined by at least one of the curvature of the first surface of the disk, the curvature of the second surface of the disk, a figure correction of at least one of the first and second surfaces, the position of the second mirror, and the radius of curvature of the second mirror.

27. The laser assembly of claim 26, wherein the pump beam intensity profile is equal to or less than the laser mode intensity profile.

28. A laser, comprising:

an optical gain medium consisting of a thin disk of a crystalline host material doped with a laser gain material and having opposite first and second surfaces, wherein:

at least one of the two surfaces of the thin disk is non-planar;

the first surface has a planar, a concave or a convex shape and is coated with a high reflectivity (HR) coating;

the second surface is coated with an anti-reflection (AR) coating;

the host material comprises yttrium aluminum garnet (YAG) having a crystallographic orientation of <110> in a direction parallel to the lasing axis of the laser;

the first surface of the disk is spaced apart from the second surface;

the first surface of the disk is connected to the second surface of the disk by a vertical side wall;

a border is disposed on the outer surface of the vertical side wall; and, the border comprises a light scattering surface of the vertical side wall.

* * * * *